United States Patent
Hasegawa et al.

(10) Patent No.: US 10,744,455 B2
(45) Date of Patent: Aug. 18, 2020

(54) NONHYDROCARBON GAS SEPARATION DEVICE AND NONHYDROCARBON GAS SEPARATION METHOD

(71) Applicant: JGC Corporation, Yokohama-shi, Kanagawa (JP)

(72) Inventors: Hiroaki Hasegawa, Yokohama (JP); Hiroshi Umino, Yokohama (JP); Yasushi Fujimura, Yokohama (JP); Aiko Matsuyama, Yokohama (JP); Syuichi Oguro, Yokohama (JP); Keiichi Nishida, Yokohama (JP); Shinji Takahashi, Yokohama (JP)

(73) Assignee: JGC Corporation (JP)

( * ) Notice: Subject to any disclaimer, the term of this patent is extended or adjusted under 35 U.S.C. 154(b) by 203 days.

(21) Appl. No.: 15/763,460

(22) PCT Filed: Oct. 1, 2015

(86) PCT No.: PCT/JP2015/005020
§ 371 (c)(1),
(2) Date: Mar. 27, 2018

(87) PCT Pub. No.: WO2017/056135
PCT Pub. Date: Apr. 6, 2017

(65) Prior Publication Data
US 2018/0272272 A1    Sep. 27, 2018

(51) Int. Cl.
*B01D 53/22* (2006.01)
*C10L 3/10* (2006.01)

(52) U.S. Cl.
CPC .......... *B01D 53/226* (2013.01); *C10L 3/104* (2013.01); *C10L 3/105* (2013.01);
(Continued)

(58) Field of Classification Search
CPC .................................. B01D 53/22; B01D 53/226; B01D 2256/245; B01D 2257/102;
(Continued)

(56) References Cited

U.S. PATENT DOCUMENTS 6,221,131 B1    4/2001  Behling et al.
6,458,190 B2 *  10/2002  Dolle .................. B01D 53/227
                                                    95/15

(Continued)

FOREIGN PATENT DOCUMENTS

JP      62-191404 A     8/1987
JP      64-43329 A      2/1989
(Continued)

*Primary Examiner* — Jason M Greene
(74) *Attorney, Agent, or Firm* — Jordan and Koda, PLLC

(57) ABSTRACT

Provided are a non-hydrocarbon gas separation device and the like capable of increasing a discharge pressure of a non-hydrocarbon gas to a downstream side while preventing an increase in size of equipment. In the non-hydrocarbon gas separation device, a first separation module (2a) and a second separation module (2b) connected to each other in series are each configured to separate a non-hydrocarbon from a natural gas through use of a separation membrane (20). The non-hydrocarbon gas having been separated from the natural gas is discharged to each of discharge lines (202) and (204). At this time, a pressure of the first separation module (2a) on a discharge line (202) side is higher than a pressure of the second separation module (2b) on a discharge line (204) or (202) side.

6 Claims, 4 Drawing Sheets

(52) U.S. Cl.
CPC .... *B01D 2256/24* (2013.01); *B01D 2256/245* (2013.01); *B01D 2257/102* (2013.01); *B01D 2257/504* (2013.01); *C10L 2290/46* (2013.01); *C10L 2290/548* (2013.01); *C10L 2290/58* (2013.01); *C10L 2290/60* (2013.01)

(58) Field of Classification Search
CPC ... B01D 2257/504; C10L 3/104; C10L 3/105; C10L 2290/58; C10L 2290/60
See application file for complete search history.

(56) References Cited

U.S. PATENT DOCUMENTS

| | | | |
|---|---|---|---|
| 2003/0131726 A1* | 7/2003 | Thomas | B01D 53/226 95/49 |
| 2004/0035291 A1* | 2/2004 | Callahan | B01D 53/227 95/50 |
| 2010/0147148 A1* | 6/2010 | Rabiei | B01D 53/226 95/247 |
| 2017/0157557 A1* | 6/2017 | Ding | B01D 53/226 |
| 2017/0320009 A1* | 11/2017 | Hirata | B01D 53/226 |
| 2017/0327758 A1* | 11/2017 | Tanaka | B01D 53/22 |
| 2018/0333674 A1* | 11/2018 | Szivacz | B01D 53/22 |

FOREIGN PATENT DOCUMENTS

| | | |
|---|---|---|
| JP | 2006-528062 A | 12/2006 |
| JP | 2010-137221 A | 6/2010 |
| JP | 2012-236134 A | 12/2012 |
| WO | 2004/026441 A1 | 4/2004 |

* cited by examiner

NONHYDROCARBON GAS SEPARATION DEVICE AND NONHYDROCARBON GAS SEPARATION METHOD

TECHNICAL FIELD

The present invention relates to a technology for separating a non-hydrocarbon gas from a natural gas.

BACKGROUND ART

A natural gas produced from a wellhead is subjected to liquefaction pretreatment for separating impurities, and then cooled to be liquefied, and shipped as a liquidized natural gas (LNG).

Some natural gases contain, as an impurity, a non-hydrocarbon gas, such as a carbon dioxide gas ($CO_2$ gas) or a nitrogen gas ($N_2$ gas), in a relatively large amount. When this kind of natural gas is treated, the non-hydrocarbon gas is discharged in a large amount in the liquefaction pretreatment.

As a method of utilizing the non-hydrocarbon gas discharged in the liquefaction pretreatment of the natural gas and reducing the emission of the non-hydrocarbon gas into the atmosphere, there is given an example in which the non-hydrocarbon gas is utilized as an injection gas in enhanced oil recovery (EOR) or enhanced gas recovery (EGR) by being injected into an oil well or a gas well. In addition, when the non-hydrocarbon gas is a $CO_2$ gas, an example in which the $CO_2$ gas is subjected to carbon dioxide capture and storage (CCS) in the ground and an example in which the $CO_2$ gas is utilized as a raw material in a urea production plant are also conceived.

Meanwhile, in the liquefaction pretreatment, as a non-hydrocarbon gas separation device configured to separate a non-hydrocarbon gas from a natural gas, there is given a non-hydrocarbon gas separation device utilizing a separation membrane capable of performing gas separation. This kind of non-hydrocarbon gas separation device is hardly accompanied by a phase change at the time of gas separation, and is configured to perform gas separation by using, as a drive energy, a difference in pressure (difference in partial pressure) of a gas to be separated before and after its permeation through the separation membrane, and utilizing a difference in gas passage speed through the separation membrane.

The non-hydrocarbon gas separation device utilizing a separation membrane has the advantages of high energy saving performance and easy handleability. Meanwhile, when the natural gas containing a non-hydrocarbon gas in a large amount is to be treated, equipment and piping constructing the non-hydrocarbon gas separation device tend to be increased in size, and there is a problem of an increase in facility cost.

In addition, when non-hydrocarbon gas recovery, such as EOR or CCS described above, is performed, the non-hydrocarbon gas needs to be sent after its pressure is increased to a pressure receivable in a recovery facility in some cases. In the case of the natural gas containing a non-hydrocarbon gas in a large amount, there is another problem in that power to send the non-hydrocarbon gas to the recovery facility is increased.

In this connection, in Patent Literature 1, there is a description of a carbon dioxide separation system in which a primary carbon dioxide separation device equipped with a zeolite membrane for carbon dioxide separation and a secondary carbon dioxide separation device that employs an amine absorption method or a pressure swing adsorption (PSA) method are connected in series. In addition, in Patent Literature 2, there is a description of a technology involving removing and recovering an acid gas from an absorbing chemical agent absorbing an acid gas, such as carbon dioxide, at a pressure of from 50 psi to 300 psi, and introducing a gaseous-phase stream containing the acid gas under the pressure to the intake of a compression device.

However, in the patent literatures, there is no description of a technology for efficiently sending the non-hydrocarbon gas while preventing an increase in size of the non-hydrocarbon gas separation device of a separation membrane mode.

CITATION LIST

Patent Literature

[PTL 1] JP 2012-236134 A: claims 1 and 9, paragraphs 0034 to 0039, and FIG. 1
[PTL 2] JP 2006-528062 A: claim 1, and paragraphs 0027 and 0029

SUMMARY OF INVENTION

Technical Problem

The present invention has been made in view of such background, and an object of the present invention is to apply a non-hydrocarbon gas separation device and a non-hydrocarbon gas separation method capable of increasing a discharge pressure of a non-hydrocarbon gas to a downstream side while preventing an increase in size of equipment.

Solution to Problem

According to one embodiment of the present invention, there is provided a non-hydrocarbon gas separation device, which is configured to separate, from a natural gas containing a non-hydrocarbon gas, the non-hydrocarbon gas, the non-hydrocarbon gas separation device including:
a first separation module and a second separation module each connected to a supply line configured to supply the natural gas, an outflow line configured to allow the natural gas having been separated from the non-hydrocarbon gas to outflow, and to a discharge line configured to discharge the non-hydrocarbon gas having been separated from the natural gas; and separation membranes, which are housed in the first separation module and the second separation module, the separation membranes each being configured to allow the non-hydrocarbon gas contained in the natural gas supplied from the supply line to permeate therethrough to a discharge line side, and to allow the natural gas having been separated from the non-hydrocarbon gas to flow to an outflow line side, in which the outflow line of the first separation module doubles as the supply line of the second separation module, and the first separation module and the second separation module are connected to each other in series, and in which a pressure of the first separation module on the discharge line side is higher than a pressure of the second separation module on the discharge line side.

The non-hydrocarbon gas separation device may have the following features.

(a) The non-hydrocarbon gas is at least one of a carbon dioxide gas or a nitrogen gas.

(b) The non-hydrocarbon gas separation device further includes compressors arranged in the discharge lines of the first separation module and the second separation module, in which the non-hydrocarbon gas increased in pressure with the compressors is supplied to a supply line for a non-hydrocarbon gas in an enhanced oil recovery (EOR) facility or an enhanced gas recovery (EGR) facility. In addition, the non-hydrocarbon gas is a carbon dioxide gas, and the non-hydrocarbon gas separation device further includes compressors arranged in the discharge lines of the first separation module and the second separation module, and the non-hydrocarbon gas increased in pressure with the compressors is supplied to a supply line for a non-hydrocarbon gas in a carbon dioxide capture and storage (CCS) facility or a urea production plant. Further, the non-hydrocarbon gas is a carbon dioxide gas, and the non-hydrocarbon gas separation device further includes a compressor arranged only in the discharge line of the second separation module or compressors arranged in the discharge lines of the first separation module and the second separation module, and the non-hydrocarbon gas discharged from the discharge lines is sent to a pipe line for transporting a carbon dioxide gas.

(c) The non-hydrocarbon gas separation device further includes compressors arranged in the discharge lines of the first separation module and the second separation module, and the discharge line of the second separation module is connected to a suction side of the compressor arranged in the discharge line of the first separation module, and the compressor arranged in the discharge line of the second separation module is configured to increase a pressure of the non-hydrocarbon gas to a pressure equal to or higher than a suction pressure of the compressor arranged in the discharge line of the first separation module.

(d) The non-hydrocarbon gas separation device further includes: pressure control units each including: a pressure detection unit, which is arranged in each of the discharge lines of the first separation module and the second separation module, and is configured to detect a pressure in each of the discharge lines; and a pressure control valve, which is arranged on a downstream side of the pressure detection unit, and is configured to control an amount of the non-hydrocarbon gas to be discharged to each of the discharge lines based on a value of pressure detected with the pressure detection unit so that the value of pressure detected is a preset target pressure; and a control unit configured to set the target pressures of the pressure control units on a first separation module side and a second separation module side so that the target pressure of the pressure control unit on the first separation module side is higher than the target pressure of the pressure control unit on the second separation module side.

According to another embodiment of the present invention, there is provided a non-hydrocarbon gas separation method, including separating, from a natural gas containing a non-hydrocarbon gas, the non-hydrocarbon gas, the non-hydrocarbon gas separation method including the steps of:

supplying the natural gas to a first separation module in which a separation membrane is housed, from a first supply line connected to the first separation module;

allowing the non-hydrocarbon gas contained in the natural gas supplied from the first supply line to permeate the separation membrane in the first separation module to be separated, followed by discharging the non-hydrocarbon gas having been separated from the natural gas from a first discharge line connected to the first separation module;

allowing the natural gas having been separated from the non-hydrocarbon gas to flow through the first separation module, followed by allowing the natural gas to outflow from a first outflow line connected to the first separation module;

supplying the natural gas having outflowed from the first separation module to a second separation module in which a separation membrane is housed, and which is connected to the first separation module in series through a second supply line doubling as the first outflow line, from the second supply line;

allowing the non-hydrocarbon gas contained in the natural gas supplied from the second supply line to permeate the separation membrane in the second separation module to be separated, followed by discharging the non-hydrocarbon gas having been separated from the natural gas from a second discharge line connected to the second separation module; and allowing the natural gas having been separated from the non-hydrocarbon gas to flow through the second separation module, followed by allowing the natural gas to outflow from a second outflow line connected to the second separation module, a pressure of the first separation module on a first discharge line side being higher than a pressure of the second separation module on a second discharge line side.

Advantageous Effects of Invention

The present invention has the following configuration: the first separation module and the second separation module in each of which the separation membrane configured to separate the non-hydrocarbon gas from the natural gas is housed are connected to each other in series; and the pressure of the non-hydrocarbon gas in the first separation module on the discharge line side is higher than the pressure of the non-hydrocarbon gas in the second separation module on the discharge line side. With this, the discharge pressure of the non-hydrocarbon gas to a downstream side can be increased while an increase in size of equipment is prevented.

DESCRIPTION OF EMBODIMENTS

Figure 1:
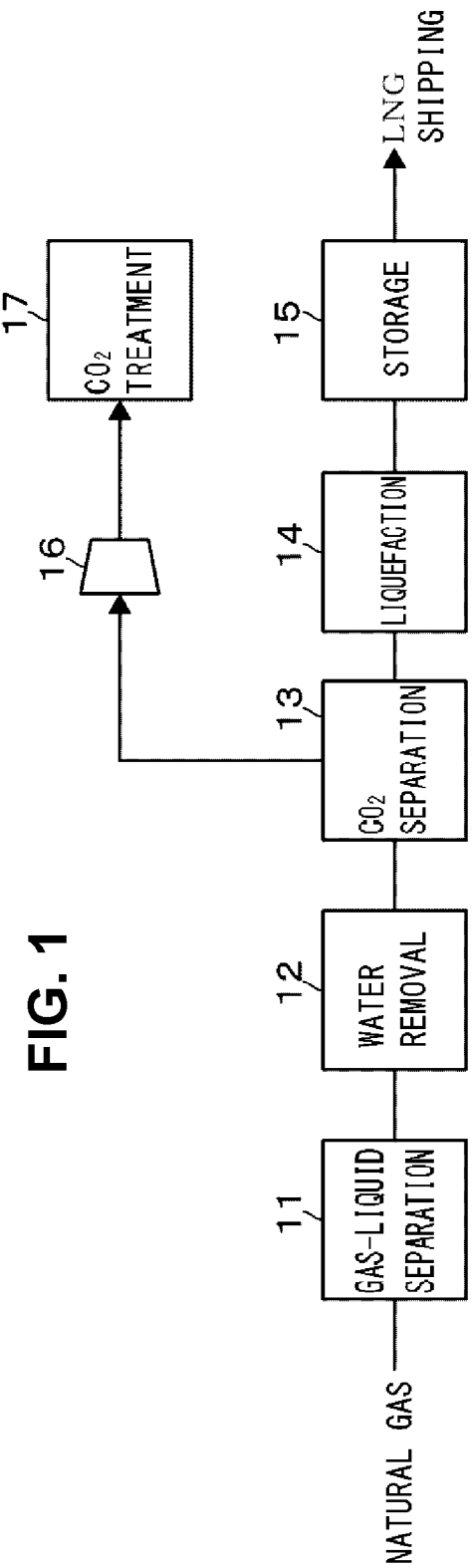
FIG. 1 is a step diagram for illustrating various treatment steps to be performed in a natural gas shipping terminal.

First, treatment on a natural gas to be performed in a liquefied natural gas (LNG) shipping terminal is summarized with reference to FIG. 1.

The natural gas to be handled in the shipping terminal of this example contains a non-hydrocarbon gas, such as a carbon dioxide ($CO_2$) gas or a nitrogen ($N_2$) gas. In this example, a description is given of a case in which a $CO_2$ gas is separated as the non-hydrocarbon gas to be removed from the natural gas.

As illustrated in FIG. 1, the natural gas is subjected to separation of a liquid in a gas-liquid separation step 11, and then to removal of water in a water removal step 12. Further, the natural gas is subjected to a $CO_2$ separation step 13, and then is liquefied to a liquefied natural gas (LNG) in a liquefaction step 14.

Liquefaction pretreatment before liquefaction of the natural gas may include, as required, a mercury removal step of removing mercury in the natural gas by adsorbing mercury onto an adsorbent, and an acid gas removal step of removing an acid gas, such as hydrogen sulfide, by absorbing the acid gas into an absorption liquid, such as an amine, in addition to the steps illustrated in FIG. 1 (the gas-liquid separation step 11, the water removal step 12, and the $CO_2$ separation step 13).

In the liquefaction step 14, the natural gas is precooled to, for example, around −40° C. with a precooling refrigerant (containing as a main component propane), and further cooled to, for example, from −155° C. to −158° C. with a main refrigerant (a mixed refrigerant of methane, ethane, propane, and nitrogen). Thus, the natural gas is liquefied to LNG.

LNG having been liquefied is subjected to a storage step 15 in a LNG tank (not shown), and then shipped to a LNG tanker or a pipe line.

In the $CO_2$ separation step 13, which is included in the liquefaction pretreatment in the treatment on a natural gas which has been summarized, a $CO_2$ gas having been separated from the natural gas is discharged. In order to utilize the $CO_2$ gas and reduce the emission of the $CO_2$ gas into the atmosphere, a $CO_2$ treatment step 17 is provided in some cases.

In the $CO_2$ treatment step 17, there is performed, for example, treatment of injecting, as an injection gas, the $CO_2$ gas into an oil well or a gas well for performing EOR or EGR described above, treatment of injecting the $CO_2$ gas into the ground for performing CCS, or treatment of sending the $CO_2$ gas to a urea production plant as a raw material for urea. In addition, a compressor (a first compressor described below) 16 configured to increase the pressure of the $CO_2$ gas discharged from the $CO_2$ separation step 13 to a receiving pressure on a $CO_2$ treatment step 17 side is arranged between a facility (a non-hydrocarbon gas separation device in this example) for performing the $CO_2$ separation step 13 and a facility for performing the $CO_2$ treatment step 17.

Next, the configuration of a non-hydrocarbon gas separation device according to an embodiment of the present invention for performing the $CO_2$ separation step 13 is described with reference to FIG. 2.

The non-hydrocarbon gas separation device of this example includes two separation modules (a first separation module 2a and a second separation module 2b) in each of which a separation membrane 20 configured to separate the $CO_2$ gas from the natural gas is housed.

The separation membrane 20 may be an organic membrane made of a polymer material or an inorganic membrane made of an inorganic material, such as Deca-Dodecasil 3R (DDR)-type zeolite.

A specific structure of the separation membrane 20 is not limited to a particular type, but examples thereof include a hollow fiber membrane as an organic membrane, and the use of a tubular member obtained by forming a DDR-type zeolite membrane on a surface of a tubular base made of a porous ceramic or the like as an inorganic membrane.

Moreover, the separation module 2 is configured by housing, in a metal main body, a plurality of the hollow fiber membranes and the tubular members, to thereby partition the main body into a space on a primary side in which the natural gas flows and a space on a secondary side in which a $CO_2$ gas having been separated from the natural gas flows.

The first separation module 2a and the second separation module 2b in each of which the separation membrane 20 described above is housed are connected to each other in series from an upstream side to a downstream side in a flow direction of the natural gas.

The first separation module 2a on the upstream side is connected to a supply line (first supply line) 201 configured to supply the natural gas, a discharge line (first discharge line) 202 configured to discharge the $CO_2$ gas having been separated from the natural gas, and to a connection line 203 connecting the first separation module 2a and the second separation module 2b on the downstream side. Regarding the first separation module 2a, the connection line 203 corresponds to an outflow line (first outflow line) configured to allow the natural gas having been separated from the $CO_2$ gas to outflow.

A first pressure control unit including: a pressure detection unit 22a which is configured to detect a pressure in the discharge line 202; and a pressure control valve 21a which is arranged on a downstream side of the pressure detection unit 22a, and is configured to control the flow rate of the $CO_2$ gas to be discharged from the first separation module 2a based on a value of pressure detected with the pressure detection unit 22a so that the value of pressure detected is a preset target pressure is arranged in the discharge line 202 of the first separation module 2a.

The first compressor 16 described above configured to increase the pressure of the $CO_2$ gas flowing through the discharge line 202 to a receiving pressure of a receiving line 170 on the $CO_2$ treatment step 17 side is arranged on a downstream side of the first pressure control unit. Herein, the receiving line 170 corresponds to a supply line for a non-hydrocarbon gas.

In actuality, the first compressor (compressor main body) constitutes a "compressor system" including: a pressure detection unit configured to detect a pressure in the discharge line 202 on a suction side of the compressor main body; a spill back line configured to return part of the $CO_2$ gas ejected from the compressor main body to the discharge line 202 on the suction side; and a spill back valve configured to control the flow rate of the $CO_2$ gas flowing through the spill back line based on a value of pressure detected with the pressure detection unit. In FIG. 2, the compressor system is illustrated simply by a square symbol. A suitable configuration may appropriately be adopted as a specific configuration of the compressor system, and hence also the compressor system is referred to as "first compressor 16" in the following description (the same applies to FIG. 3) for convenience of description.

Next, the second separation module 2b on the downstream side is connected to the connection line 203, the discharge line 202 configured to discharge the $CO_2$ gas having been separated from the natural gas, and to an outflow line (second outflow line) 205 configured to allow the natural gas having been separated from the $CO_2$ gas to outflow. An intermediate line 204 is arranged between a main body of the second separation module 2b and the discharge line 202.

Regarding the second separation module 2b, the connection line 203 corresponds to a supply line (second supply line) configured to supply the natural gas from which part of the $CO_2$ gas has been separated with the first separation module 2a. In addition, the intermediate line 204 and the discharge line 202 on a downstream side of a joint portion with the intermediate line 204 correspond to a discharge line (second discharge line) configured to discharge the $CO_2$ gas separated with the second separation module 2b.

Further, a second pressure control unit including: a pressure detection unit 22b which is configured to detect a pressure in the intermediate line 204; and a pressure control valve 21b which is arranged on a downstream side of the pressure detection unit 22b, and is configured to control the flow rate of the $CO_2$ gas to be discharged from the second separation module 2b based on a value of pressure detected with the pressure detection unit 22b so that the value of pressure detected is a preset target pressure is arranged in the intermediate line 204 of the second separation module 2b.

A second compressor 23 configured to increase the pressure of the $CO_2$ gas flowing through the intermediate line 204 is arranged on a downstream side of the second pressure control unit. Further, the intermediate line 204 on an ejection side of the second compressor 23 is joined to the suction side of the first compressor 16 arranged in the discharge line 202 of the first separation module 2a.

Herein, in actuality, also the above-mentioned second compressor (compressor main body) 23 constitutes the similar compressor system to that in the case of the first compressor 16. Also the compressor system is referred to as "second compressor 23" in the following description.

Herein, the target pressures of the first and second pressure control units are set by a control unit 3, which is a control computer placed in, for example, a control room of a shipping terminal.

In addition, as is apparent from the fact that the second compressor 23 is arranged in the intermediate line 204 arranged between the main body of the second separation module 2b and the discharge line 202, the target pressures are set so that the pressure in the discharge line 202 is higher than the pressure in the intermediate line 204.

Figure 3:
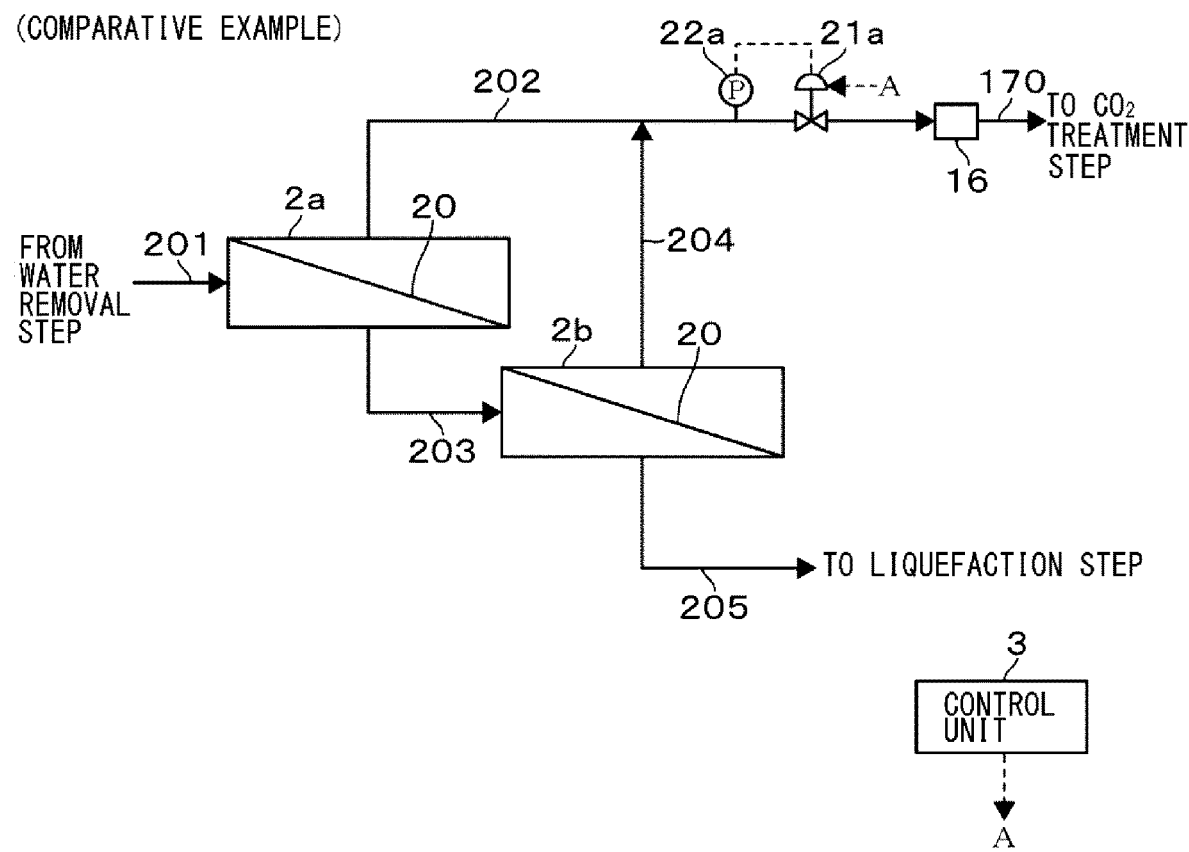
FIG. 3 is a configuration diagram of a non-hydrocarbon gas separation device according to Comparative Example.

Now, the non-hydrocarbon gas separation device according to this embodiment is described in comparison with a non-hydrocarbon gas separation device according to Comparative Example illustrated in FIG. 3 for clearer understanding of its features.

Figure 2:
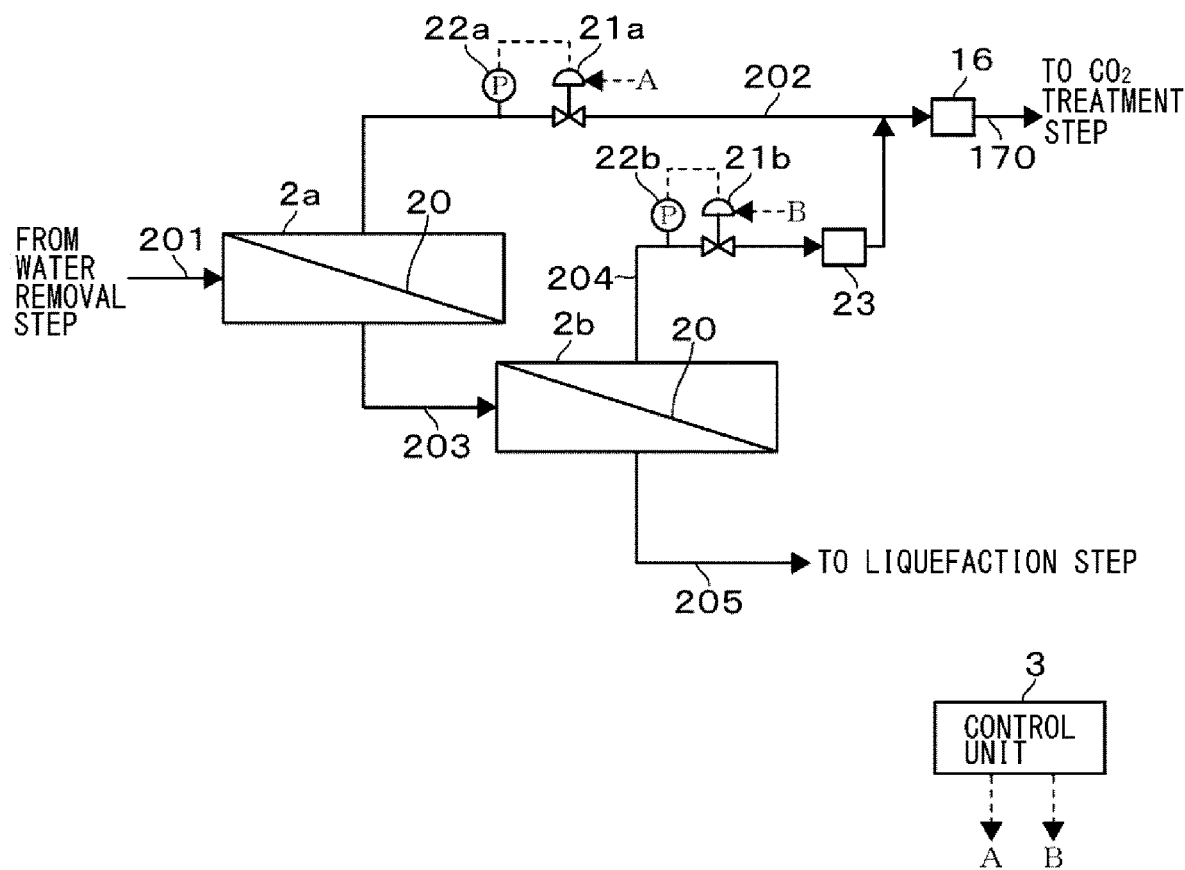
FIG. 2 is a configuration diagram of a non-hydrocarbon gas separation device for performing a $CO_2$ separation step, which is liquefaction pretreatment in the shipping terminal.

In Comparative Example, a constituent in common with the non-hydrocarbon gas separation device illustrated in FIG. 2 is denoted by the same symbol.

When compared to the non-hydrocarbon gas separation device according to this embodiment (FIG. 2), the non-hydrocarbon gas separation device according to Comparative Example differs therefrom in that the second compressor 23 is not arranged in the intermediate line 204. In addition, a terminal of the intermediate line 204 is joined to an upstream side of a pressure control unit (the pressure control valve 21a and the pressure detection unit 22a) arranged in the discharge line 202.

That is, it is found that, in the non-hydrocarbon gas separation device according to Comparative Example, a pressure in the discharge line 202 connected to the first separation module 2a and a pressure in the intermediate line 204 connected to the second separation module 2b are the same.

Herein, as described in the "Background Art" section, the non-hydrocarbon gas separation device using the separation membrane 20 is configured to separate the $CO_2$ gas from the natural gas by using, as a drive energy, a difference in pressure (difference in partial pressure) of the $CO_2$ gas before and after its permeation through the separation membrane 20.

Accordingly, when the pressure of the natural gas flowing in each of the spaces of the separation modules 2a and 2b on the primary sides and the concentration of the $CO_2$ gas in the natural gas are constant, a permeation speed of the $CO_2$ gas through the separation membrane 20 becomes higher as the pressure in each of the spaces on the secondary sides in each of which the $CO_2$ gas having been separated from the natural gas flows becomes lower (a difference between the partial pressure of the $CO_2$ gas on the primary side and the partial pressure of the $CO_2$ gas on the secondary side becomes larger).

Moreover, as the permeation speed of the $CO_2$ gas becomes higher, the area of the separation membrane 20 required for allowing a predetermined amount of the $CO_2$ gas to permeate during a time period in which the natural gas passes through the space on the primary side becomes smaller. In addition, the pressures in the spaces of the separation modules 2a and 2b on the secondary sides are determined by the pressures in the discharge line 202 and the intermediate line 204 connected to the separation modules 2a and 2b, respectively.

Herein, the "pressure in the space of the first separation module 2a on the secondary side" corresponds to the "pressure of the first separation module 2a on a discharge line (first discharge line) 202 side" in this embodiment, and the "pressure in the space of the second separation module 2b on the secondary side" corresponds to the "pressure of the second separation module 2a on an intermediate line (second discharge line) 204 side" in this embodiment.

From the above-mentioned relationship, it can be said that, in the non-hydrocarbon gas separation device according to Comparative Example, as the pressures in the discharge line 202 and the intermediate line 204 are reduced more, the membrane areas of the separation membranes 20 are reduced more and thus the sizes of the separation modules 2a and 2b can be reduced more.

Meanwhile, reductions in pressures in the discharge line 202 and the intermediate line 204 lead to increases in volumes of the $CO_2$ gases flowing therethrough, and, in turn, increases in diameters of pipes constructing the discharge line 202 and the intermediate line 204.

In particular, a natural gas is treated in a large amount in a LNG shipping terminal, and some non-conventional natural gases, which have been developed in recent years, contain a non-hydrocarbon gas, such as a $CO_2$ gas, at a relatively high concentration. Under such background, the increases in diameters of pipes used for the discharge line 202 and the intermediate line 204 have a highly increasing impact on facility cost.

In addition, when the pressure of the $CO_2$ gas flowing through the discharge line 202 is reduced, the compressor 16 having a high compression ratio is required, which also leads to increases in equipment cost and energy consumption amount.

The problems described above can be solved by increasing the pressures in the discharge line 202 and the intermediate line 204. However, in this case, a difference between a pressure on the primary side and a pressure on the secondary side (difference in partial pressure of the $CO_2$ gas) is reduced in each of the separation modules 2a and 2b, and hence the permeation speed of the $CO_2$ gas is reduced, which leads to an increase in area of the separation membrane 20 and an increase in size of each of the separation modules 2a and 2b. As calculation results are shown in [Examples]

described below, it was revealed that, in the non-hydrocarbon gas separation device according to Comparative Example, a required membrane area was drastically increased with increases in pressures in the discharge line 202 and the intermediate line 204.

As described above, conflicting problems occur in the non-hydrocarbon gas separation device using the separation membrane 20 when the pressures in the discharge line 202 and the intermediate line 204 are reduced or increased. In order to solve those problems, the inventors of the present invention have focused attention on a difference between the partial pressure of the $CO_2$ gas in the natural gas to be supplied to the separation module 2a and the partial pressure of the $CO_2$ gas in the natural gas to be supplied to the separation module 2b.

That is, in the non-hydrocarbon gas separation device in which the two separation modules 2a and 2b are connected to each other in series, the partial pressure of the $CO_2$ gas to be supplied from the supply line 201 to the first separation module 2a is higher than the partial pressure of the $CO_2$ gas to be supplied from the connection line 203 to the second separation module 2b.

Accordingly, when the pressures in the spaces of the separation modules 2a and 2b on the secondary sides are the same (the pressure in the discharge line 202 and the pressure in the intermediate line 204 are the same) as in Comparative Example, it can be said that the first separation module 2a has a higher permeation speed through the separation membrane 20 and thus separates the $CO_2$ gas in a larger amount than the second separation module 2b (a higher load is applied to a first separation module 2a side).

Through utilization of the fact that the partial pressure of the $CO_2$ gas in the natural gas to be supplied to the first separation module 2a is higher, even when the pressure in the space on the secondary side is increased to some extent, a reduction in permeation speed in the first separation module 2a can be suppressed to the extent that the concentration of $CO_2$ in the natural gas to be transferred to the liquefaction step 14 can be kept at a target value. When the pressure in the space of the first separation module 2a on the secondary side is increased, the pipe diameter of a pipe constructing the discharge line 202 can be reduced.

Meanwhile, regarding the second separation module 2b, in which the partial pressure of the $CO_2$ gas in the natural gas to be supplied thereto is lower than in the first separation module 2a, the pressure in the intermediate line 204 connected to the second separation module 2b is kept in a lower state than the pressure in the discharge line 202 on a first separation module 2a side. With this, the following situation is prevented: when also the pressure in the intermediate line 204 is increased, a difference between the partial pressure of the $CO_2$ gas in the second separation module 2b on the primary side and the partial pressure of the $CO_2$ gas in the second separation module 2b on the secondary side becomes excessively small, with the result that a required membrane area is excessively increased.

The non-hydrocarbon gas separation device according to this embodiment illustrated in FIG. 2 is configured based on the above-mentioned concept.

However, when the pressure in the discharge line 202 on the first separation module 2a side is increased as compared to Comparative Example, the membrane area of the separation membrane 20 in the first separation module 2a needs to be increased in order that a $CO_2$ gas separation capacity in this embodiment is comparable to that of Comparative Example (in order to achieve the same concentration of the $CO_2$ gas in the natural gas outflowing from the outflow line 205 when the natural gas containing the $CO_2$ gas is supplied under the same conditions). Regarding this point, as shown in [Examples] described below, it is confirmed that an increase in membrane area can be suppressed for the entirety of the non-hydrocarbon gas separation device in the case in which only the pressure in the discharge line 202 is increased as compared to the case in which both the pressures in the discharge line 202 and the intermediate line 204 are increased.

In addition, the second compressor 23 is arranged in the intermediate line 204 in the non-hydrocarbon gas separation device according to this embodiment because the pressure in the intermediate line 204 is lower than the pressure in the discharge line 202. Also regarding this point, as shown in [Examples] described below, it is confirmed that, even when only the pressure in the discharge line 202 is increased, power consumed in the first and second compressors and 23 can be reduced for the entirety of the non-hydrocarbon gas separation device as compared to a predetermined base case.

Herein, the supply pressure of the natural gas from the supply line 201, the target pressures of the discharge line 202 and the intermediate line 204, and the like vary depending on preconditions, such as the concentration of the $CO_2$ gas in the natural gas to be supplied from the supply line 201 and a target value of the concentration of the $CO_2$ gas in the natural gas outflowing from the outflow line 205. Therefore, it is difficult to specify a specific operation range without any particular preconditions.

Therefore, a pressure range under rough preconditions is given. For example, given that the concentration of the $CO_2$ gas in the natural gas to be supplied from the supply line 201 is from 5 mol % to 70 mol % and the concentration of the $CO_2$ gas in the natural gas outflowing from the outflow line 205 is from a concentration measurement limit to 1 mol %. In this case, there may be given an example in which the supply pressure of the natural gas from the supply line 201 ranges from 1,200 kPa to 8,000 kPa, the target pressure of the discharge line 202 ranges from 100 kPa to 1,200 kPa, and the target pressure of the intermediate line 204 ranges from 1 kPa to 1,200 kPa (a difference in pressure between the discharge line 202 and the intermediate line 204 ranges from 100 kPa to 1,200 kPa).

The actions of the non-hydrocarbon gas separation device having the above-mentioned configuration are described.

The natural gas from which a liquid and water have been separated and removed in the steps 11 and 12 on an upstream side flows into the first separation module 2a on the upstream side through the supply line 201. In the first separation module 2a, the $CO_2$ gas is separated from the natural gas at a permeation speed corresponding to a difference between the partial pressure of the $CO_2$ gas on the primary side and the partial pressure of the $CO_2$ gas on the secondary side through intermediation of the separation membrane 20.

In this case, the pressure in the space of the first separation module 2a on the secondary side in which the $CO_2$ gas having permeated flows is controlled by the first pressure control unit (the pressure control valve 21a and the pressure detection unit 22a) arranged in the discharge line 202. Specifically, the pressure control valve 21a is configured to change its valve opening so that the pressure in the discharge line 202 detected with the pressure detection unit 22a becomes closer to the target pressure set by the control unit 3.

When the space of the first separation module 2a on the secondary side and the discharge line 202 upstream of the pressure detection unit 22a each have a sufficiently small pressure loss, a value of pressure to be detected with the pressure detection unit 22a can be regarded as the pressure in the space of the first separation module 2a on the secondary side. As a matter of course, it is also appropriate to arrange the pressure detection unit 22a in the space of the first separation module 2a on the secondary side and directly control the pressure in the space on the secondary side by the pressure control valve 21a arranged in the discharge line 202.

The natural gas, which flows through the first separation module 2a just for a retention time period which is determined depending on the volume of the space on the primary side and the flow rate of the natural gas, is subjected to separation of the $CO_2$ gas with the separation membrane 20 during the time period. Moreover, the natural gas outflows into the connection line 203 under the state in which the concentration of the $CO_2$ gas is reduced to be lower than that at the time of inflow from the supply line 201. Meanwhile, the $CO_2$ gas having permeated the separation membrane 20 is discharged from the first separation module 2a to the discharge line 202.

Next, the natural gas having outflowed into the connection line 203 flows into the second separation module 2b connected to a downstream side of the connection line 203. Also in the second separation module 2b, the $CO_2$ gas is separated from the natural gas at a permeation speed corresponding to a difference between the partial pressure of the $CO_2$ gas on the primary side and the partial pressure of the $CO_2$ gas on the secondary side through intermediation of the separation membrane 20.

Moreover, the second separation module 2b is the same as the first separation module 2a in that the pressure in the space of the second separation module 2b on the secondary side in which the $CO_2$ gas having permeated flows is controlled by the second pressure control unit (the pressure control valve 21b and the pressure detection unit 22b) arranged in the intermediate line 204. In this case, the control unit 3 is configured to set the target pressures so that the target pressure set for the second pressure control unit is lower than the target pressure set for the first pressure control unit.

Also regarding the second separation module 2b, when the space on the secondary side and the intermediate line 204 upstream of the pressure detection unit 22b each have a sufficiently small pressure loss, a value of pressure to be detected with the pressure detection unit 22b can be regarded as the pressure in the space of the second separation module 2b on the secondary side. The second separation module 2b is the same as the first separation module 2a in that it is also appropriate to arrange the pressure detection unit 22b in the space of the second separation module 2b on the secondary side and directly control the pressure in the space on the secondary side by the pressure control valve 21b arranged in the intermediate line 204, instead of adopting the above-mentioned example.

The natural gas, which flows through the second separation module 2b just for a retention time period which is determined depending on the volume of the space on the primary side and the flow rate of the natural gas, is subjected to separation of the $CO_2$ gas with the separation membrane 20 during the time period. Moreover, the natural gas outflows into the outflow line 205 under the state in which the concentration of the $CO_2$ gas is reduced to a target concentration, and is then transferred to the liquefaction step 14 serving as a subsequent step. Meanwhile, the $CO_2$ gas having permeated the separation membrane 20 is discharged from the second separation module 2b to the intermediate line 204.

The $CO_2$ gas discharged to the intermediate line 204 is increased in pressure with the second compressor 23, and is then joined to the $CO_2$ gas flowing through the discharge line 202. The second compressor 23 is configured to increase the pressure of the $CO_2$ gas to a pressure equal to or higher than the suction pressure of the first compressor 16 arranged on a discharge line 202 side.

The $CO_2$ gas discharged from the first separation module 2a to the discharge line 202 and the $CO_2$ gas discharged from the second separation module 2b and joined to the $CO_2$ gas in the discharge line 202 through the intermediate line 204 are increased in pressure with the first compressor 16 to a pressure equal to or higher than a receiving pressure of the $CO_2$ treatment step 17. The $CO_2$ gas having been increased in pressure is supplied to a facility on a $CO_2$ treatment step 17 side through the receiving line 170.

In view of the actions of the non-hydrocarbon gas separation device described above, for example, a case in which the concentration of the $CO_2$ gas in the natural gas supplied from the supply line 201 is increased, and the concentration of the $CO_2$ gas in the natural gas outflowing from the outflow line 205 may exceed a target concentration is considered. In this case, the permeation speed of the $CO_2$ gas through the separation membrane 20 needs to be increased by increasing a difference between the partial pressure of the $CO_2$ gas on the primary side and the partial pressure of the $CO_2$ gas on the secondary side in each of the separation modules 2a and 2b.

Possible measures to achieve such increase are to increase the pressure in the space on the primary side in each of the separation modules 2a and 2b and to reduce the pressure in the space on the secondary side in each of the separation modules 2a and 2b. The pressure in the space on the primary side may be increased, for example, by increasing the opening of a pressure control valve (not shown) which is arranged on an upstream side of the supply line 201, and is configured to control the supply pressure of the natural gas to the non-hydrocarbon gas separation device, to thereby increase an outlet pressure of the pressure control valve. In addition, when a compressor (not shown) is arranged on the upstream side of the supply line 201, an operation of increasing an ejection pressure of the compressor may be performed. Meanwhile, the pressure in the space on the secondary side may be reduced by allowing the control unit 3 to change target pressure settings for the first and second pressure control units so that the target pressures are reduced. Also in this case, the target pressure settings are changed so that the relationship in which the target pressure set for the first pressure control unit is higher than the target pressure set for the second pressure control unit is maintained.

The non-hydrocarbon gas separation device according to this embodiment has the following effects. The non-hydrocarbon gas separation device has the following configuration: the first separation module 2a and the second separation module 2b in each of which the separation membrane configured to separate the $CO_2$ gas (non-hydrocarbon gas) from the natural gas is housed are connected to each other in series; and the pressure of the first separation module 2a on the discharge line 202 side is higher than the pressure of the second separation module 2b on the intermediate line 204 side. With this, an increase in pipe diameter of the discharge line of the first separation module 2a and an increase in size of the second separation module 2b are prevented, and the discharge pressure of the $CO_2$ gas to a downstream side can be increased.

Herein, the example illustrated in FIG. 2 has a configuration in which the intermediate line 204 configured to discharge the $CO_2$ gas from the second separation module 2b is joined to the discharge line 202 on the first separation module 2a side, but it is not essential to join these lines 202 and 204 to each other. For example, the discharge line (second discharge line) 204 independent of the discharge line 202 on the first module 2a side may be connected to the second separation module 2b. In this case, there may be adopted a configuration in which the second compressor arranged in the discharge line 204 on a second separation module 2b side is configured to increase the pressure of the $CO_2$ gas to a pressure equal to or higher than the receiving pressure of the facility on the $CO_2$ treatment step 17 side, and the $CO_2$ gas is supplied independent of the discharge line 202 on the first separation module 2a side.

Further, it is also not essential to arrange the first and second compressors 16 and 23 in the discharge line 202 and the intermediate line 204, respectively, to increase the pressure to the receiving pressure on the $CO_2$ treatment step 17 side. Instead of adopting a mode in which the compressors 16 and 23 are arranged in the non-hydrocarbon gas separation device, for example, it is also appropriate to arrange a compressor in the facility on the $CO_2$ treatment step 17 side to increase the pressure to a pressure required in $CO_2$ gas treatment.

Other than the above, the non-hydrocarbon gas separation device may include three or more separation modules connected in series. When attention is focused on two of the separation modules adjacent to each other in an anteroposterior direction and connected to each other, and the relationship in which the pressure of the first separation module 2a on the upstream side on the discharge line 202 side is higher than the pressure of the second separation module 2b on the downstream side on the discharge line 204 side is established, such non-hydrocarbon gas separation device is included in the technical scope of the present invention.

In the embodiment of the non-hydrocarbon gas separation device, which has been described with reference to FIG. 2 and the like, the non-hydrocarbon gas to be separated from the natural gas through use of the separation membrane 20 is not limited to the $CO_2$ gas. For example, the non-hydrocarbon gas may be a $N_2$ gas, and also the $N_2$ gas may be subjected to treatment of being injected into an oil well or a gas well as an injection gas for EOR or EGR.

Further, when the non-hydrocarbon gas is the $CO_2$ gas, it is also appropriate to perform the $CO_2$ gas treatment at a place distant from the LNG shipping terminal and send the $CO_2$ gas from the first separation module 2a and the second separation module 2b to a pipe line for transportation configured to transport the $CO_2$ gas to the place for performing the treatment. In this case, it is not essential to arrange the compressors 16 and 23 in the discharge line 202 on the first separation module 2a side and the intermediate line 204 on the second separation module 2b side, respectively. For example, only the compressor 23 may be arranged in the intermediate line 204 on the second separation module 2b side having a lower discharge pressure.

EXAMPLES (Calculation of Compressor Power Ratio and Separation Membrane Area)

In each of the non-hydrocarbon gas separation devices according to the embodiment of the present invention and Comparative Example illustrated in FIG. 2 and FIG. 3, respectively, the pressures in the spaces of each of the first separation module 2a and the second separation module 2b on the primary side and the secondary side were changed. Under such conditions, a change in power required for increasing a discharge pressure of a non-hydrocarbon gas to a predetermined pressure, and a change in membrane area of the separation membrane 20 required for reducing the concentration of the non-hydrocarbon gas in a natural gas to a target concentration were calculated.

A. Calculation Conditions

The supply conditions (a temperature, a pressure, and a flow rate) and composition of a natural gas to be supplied to each of the non-hydrocarbon gas separation devices are shown in (Table 1). The natural gas was treated with each of the non-hydrocarbon gas separation devices according to the embodiment and Comparative Example, and power of a compressor/compressors required for increasing the pressures in the spaces of the first separation module 2a and the second separation module 2b on the secondary sides to 15,000 kPa was calculated. In addition, a membrane area of the separation membrane 20 (a total value of membrane areas in the first separation module 2a and the second separation module 2b) required for reducing the concentration of the $CO_2$ gas in the natural gas to 5 mol % was calculated. A process simulator PRO/II (U.S. registered trademark) was used for those calculations.

TABLE 1

|  |  | Natural gas |
|---|---|---|
| Temperature | ° C. | 45 |
| Pressure | kPa | 8,000 |
| Flow rate | kg-mol/hr | 300 |
| Composition |  |  |
| Carbon dioxide | mol % | 50.0 |
| Nitrogen | mol % | 4.0 |
| Methane | mol % | 42.0 |
| Ethane | mol % | 2.0 |
| Propane | mol % | 1.0 |
| Butane | mol % | 0.4 |
| Pentane | mol % | 0.3 |
| Hydrocarbons having 6 or more carbon atoms | mol % | 0.3 |

(Reference Example) As a base case, the required power and membrane area were calculated for the non-hydrocarbon gas separation device according to Comparative Example in which the pressure in the space of the first separation module 2a on the secondary side was 200 kPa and the pressure in the space of the second separation module 2b on the secondary side was 200 kPa.

Example 1

The calculations were performed under the same conditions as in Reference Example except that the pressure in the space of the first separation module 2a on the secondary side was changed to 600 kPa.

Example 2

The calculations were performed under the same conditions as in Reference Example except that the pressure in the space of the first separation module 2a on the secondary side was changed to 1,800 kPa.

Comparative Example 1

The calculations were performed under the same conditions as in Reference Example except that the pressures in the spaces of the first separation module 2a and the second separation module 2b on the secondary sides were each changed to 400 kPa.

Comparative Example 2

The calculations were performed under the same conditions as in Reference Example except that the pressures in the spaces of the first separation module 2a and the second separation module 2b on the secondary sides were each changed to 600 kPa.

Comparative Example 3

The calculations were performed under the same conditions as in Reference Example except that the pressures in the spaces of the first separation module 2a and the second separation module 2b on the secondary sides were each changed to 1,800 kPa.

B. Calculation Results

Figure 4:
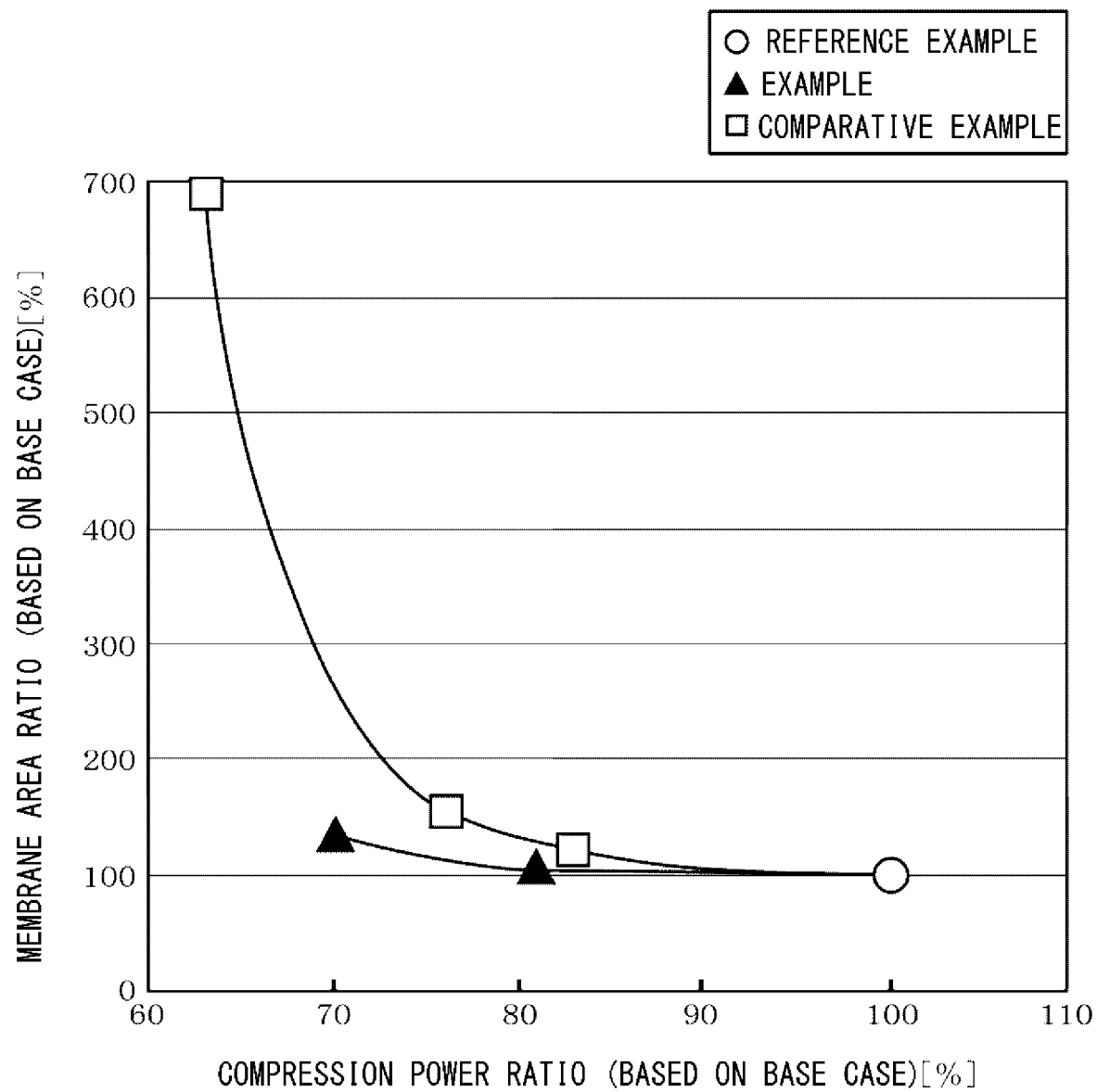
FIG. 4 is an explanatory diagram for showing a change in compression power required for increasing the pressure of a $CO_2$ gas and a change in membrane area of a separation membrane with a change in pressure on a discharge line side.

The calculation results of the ratios of: the calculation results of the required power and membrane area in each of Examples 1 and 2 and Comparative Examples 1 to 3; to the calculation results of those values in Reference Example (base case) (the ratio in required power is hereinafter referred to as "compressor power ratio," and the ratio in membrane area is hereinafter referred to as "membrane area ratio") are shown in (Table 2). In addition, a result obtained by plotting the ratio of the membrane area to the compressor power ratio is shown in FIG. 4. In FIG. 4, the compressor power ratio is plotted on the abscissa, and the membrane area ratio is plotted on the ordinate (each ratio is represented in percent). In FIG. 4, Reference Example, Examples, and Comparative Examples are plotted by an open circle, solid triangles, and open squares, respectively.

TABLE 2

|  | Pressure in space on secondary side [kPa] | | Compressor power ratio [%] | Membrane area ratio [%] |
| --- | --- | --- | --- | --- |
|  | First separation module | Second separation module |  |  |
| Reference Example | 200 | 200 | 100 | 100 |
| Example 1 | 600 | 200 | 81 | 108 |
| Example 2 | 1,800 | 200 | 70 | 135 |
| Comparative Example 1 | 400 | 400 | 83 | 122 |
| Comparative Example 2 | 600 | 600 | 76 | 154 |
| Comparative Example 3 | 1,800 | 1,800 | 63 | 690 |

From the results shown in Table 2, it was able to be confirmed that the compressor power ratio was able to be reduced in each of Examples 1 and 2 as compared to Reference Example serving as a base case by increasing only the pressure in the space of the first separation module 2a on the secondary side. In addition, a range of increase in membrane area ratio was able to be reduced in each of Examples 1 and 2 as compared to the results of Comparative Examples 1 to 3, in which the membrane area ratio was drastically increased when the pressures in the spaces of both the first separation module 2a and the second separation module 2b on the secondary sides were increased.

REFERENCE SIGNS LIST 16 first compressor
2a first separation module
2b second separation module
20 separation membrane
201 supply line
202 discharge line
203 connection line
204 intermediate line
205 outflow line
21a, 21b pressure control valve
22a, 22b pressure detection unit
23 second compressor

The invention claimed is:

1. A non-hydrocarbon gas separation device, which is configured to separate, from a natural gas containing a non-hydrocarbon gas, the non-hydrocarbon gas, the non-hydrocarbon gas separation device comprising:

a first separation module and a second separation module each connected to a supply line configured to supply the natural gas, an outflow line configured to allow the natural gas having been separated from the non-hydrocarbon gas to outflow, and to a discharge line configured to discharge the non-hydrocarbon gas having been separated from the natural gas;

separation membranes, which are housed in the first separation module and the second separation module, the separation membranes each being configured to allow the non-hydrocarbon gas contained in the natural gas supplied from the supply line to permeate therethrough to a discharge line side, and to allow the natural gas having been separated from the non-hydrocarbon gas to flow to an outflow line side;

compressors arranged in the discharge lines of the first separation module and the second separation module;

first and second pressure control units respectively arranged along the respective discharge lines of the first and second separation modules on a suction side of a corresponding compressor of said compressors, each one of the first and second pressure control units including: a pressure detection unit configured to detect a pressure in a corresponding one of said discharge lines, and a pressure control valve arranged on a downstream side of the corresponding pressure detection unit and configured to control an amount of the non-hydrocarbon gas to be discharged along said corresponding one of said discharge lines based on a value of pressure detected with the corresponding pressure detection unit so that the value of pressure detected is a preset target pressure for the corresponding one of said discharge lines; and a control unit configured to set, respectively, the target pressure for each one of the first and second pressure control units so that the target pressure of the first pressure control unit on a first separation module side of the first pressure control unit is higher than the target pressure of the second pressure control unit on a second separation module side of the second pressure control unit; and wherein the outflow line of the first separation module doubles as the supply line of the second separation module, and the first separation module and the second separation module are connected to each other in series, wherein a pressure of the first separation module on the discharge line side is higher than a pressure of the second separation module on the discharge line side under the pressure control of the first and second pressure control units, and wherein the discharge line of the second separation module is connected to a suction side of the compressor arranged in the discharge line of the first separation module, and the compressor arranged in the discharge line of the second separation module is configured to increase a pressure of the non-hydrocarbon gas to a pressure equal to or higher than a suction pressure of the compressor arranged in the discharge line of the first separation module.

2. A non-hydrocarbon gas separation device according to claim 1, wherein the non-hydrocarbon gas is at least one of a carbon dioxide gas or a nitrogen gas.

3. A non-hydrocarbon gas separation device according to claim 1, wherein the non-hydrocarbon gas increased in pressure with the compressors is supplied to a supply line for a non-hydrocarbon gas in an enhanced oil recovery (EOR) facility or an enhanced gas recovery (EGR) facility.

4. A non-hydrocarbon gas separation device according to claim 1, wherein the non-hydrocarbon gas is a carbon dioxide gas, and wherein the non-hydrocarbon gas increased in pressure with the compressors is supplied to a supply line for a non-hydrocarbon gas in a carbon dioxide capture and storage (CCS) facility or a urea production plant.

5. A non-hydrocarbon gas separation device according to claim 1, wherein the non-hydrocarbon gas is a carbon dioxide gas, and wherein the non-hydrocarbon gas discharged from the discharge lines is sent to a pipe line for transporting a carbon dioxide gas.

6. A non-hydrocarbon gas separation method for separating, from a natural gas containing a non-hydrocarbon gas, the non-hydrocarbon gas, the non-hydrocarbon gas separation method comprising the steps of:

supplying the natural gas to a first separation module in which a separation membrane is housed, from a first supply line connected to the first separation module;

allowing the non-hydrocarbon gas contained in the natural gas supplied from the first supply line to permeate the separation membrane in the first separation module to be separated, followed by discharging the non-hydrocarbon gas having been separated from the natural gas from a first discharge line connected to the first separation module;

allowing the natural gas having been separated from the non-hydrocarbon gas to flow through the first separation module, followed by allowing the natural gas to outflow from a first outflow line connected to the first separation module;

supplying the natural gas having outflowed from the first separation module to a second separation module in which a separation membrane is housed, and which is connected to the first separation module in series through a second supply line doubling as the first outflow line, from the second supply line;

allowing the non-hydrocarbon gas contained in the natural gas supplied from the second supply line to permeate the separation membrane in the second separation module to be separated, followed by discharging the non-hydrocarbon gas having been separated from the natural gas from a second discharge line connected to the second separation module;

allowing the natural gas having been separated from the non-hydrocarbon gas to flow through the second separation module, followed by allowing the natural gas to outflow from a second outflow line connected to the second separation module;

increasing pressures of the non-hydrocarbon gas by compressors arranged in the discharge lines of the first separation module and the second separation module respectively, wherein the discharge line of the second separation module is connected to a suction side of the compressor arranged in the discharge line of the first separation module;

detecting a pressure in the discharge line of the first separation module with a first pressure detection unit arranged at a suction side of the corresponding compressor arranged in the discharge line of the first separation module, and detecting a pressure in the discharge line of the second separation module with a second pressure detection unit arranged at a suction side of the corresponding compressor arranged in the discharge line of the second separation module; and controlling a first pressure control valve arranged between the first pressure detection unit and the corresponding compressor along the discharge line for the first separation module based on a value of pressure detected with the first pressure detection unit so that said value of pressure detected is a first preset target pressure, and controlling a second pressure control valve arranged between the second pressure detection unit and the corresponding compressor along the discharge line for the second separation module based on a value of pressure detected with the second pressure detection unit so that said value of pressure detected with the second pressure detection unit is a second preset target pressure, wherein said first pressure control unit and said second pressure control unit are controlled so that said first preset target pressure is maintained higher than said second preset target pressure;

wherein a pressure of the first separation module on a first discharge line side is higher than a pressure of the second separation module on a second discharge line side under the pressure control implemented by said first pressure control valve and said second pressure control valve, and wherein the compressor arranged in the discharge line of the second separation module is configured to increase a pressure of the non-hydrocarbon gas to a pressure equal to or higher than a suction pressure of the compressor arranged in the discharge line of the first separation module.

* * * * *